United States Patent [19]

Dinanath

[11] Patent Number: 4,708,056
[45] Date of Patent: Nov. 24, 1987

[54] COCONUT DEHUSKING MACHINE

[75] Inventor: Chandra Dinanath, Chaguanas, Trinidad and Tobago

[73] Assignee: Caribbean Industrial Research Institute, Trinidad and Tabago, Trinidad and Tobago

[21] Appl. No.: 7,805

[22] Filed: Jan. 28, 1987

[51] Int. Cl.⁴ .............................................. A23N 5/00
[52] U.S. Cl. ..................................... 99/575; 99/568; 99/584; 99/593; 99/623; 426/482
[58] Field of Search ......................... 99/568, 574–576, 99/581, 582, 584, 585, 588, 590, 591, 593, 594, 621, 623, 624, 629; 426/482, 483

[56] References Cited

U.S. PATENT DOCUMENTS

| | | |
|---|---|---|
| 801,593 | 10/1905 | Ireland .............................. 99/575 X |
| 807,551 | 12/1905 | Gordon ................................. 99/575 |
| 1,554,516 | 9/1925 | Olds, Jr. ............................... 99/568 |
| 1,808,744 | 6/1931 | Baudino ............................... 99/575 |
| 2,654,054 | 9/1953 | Morelock ......................... 99/568 X |
| 3,605,834 | 9/1971 | Cancel .................................. 99/568 |
| 4,347,260 | 8/1982 | Crompton ........................ 99/574 X |
| 4,350,088 | 9/1982 | Rubio, Jr. ........................ 99/574 X |
| 4,448,115 | 5/1984 | Volk, Sr. ............................... 99/574 |

Primary Examiner—Timothy F. Simone
Attorney, Agent, or Firm—John Cyril Malloy

[57] ABSTRACT

A machine specifically designed to remove the husks from the coconut fruit including a plurality of rollers rotating in opposite directions effectively toward one another wherein each roller includes a plurality of penetrating spikes sharpened to penetrate and effectively engage the husk portion of the coconut fruit. The interaction of the rollers in combination with the gripping action of the spike serves to tear away the husk from the nut leaving the nut in tact.

15 Claims, 3 Drawing Figures

COCONUT DEHUSKING MACHINE

BACKGROUND OF THE INVENTION

1. Field of the Invention

This invention relates to a machine for removing the husk from the nut portion of a coconut fruit in a manner which leaves the nut in tact and insures that the husk is separated from the fruit and from the dehusking machine itself.

2. Description of the Prior Art

In the harvesting and preparation of various natural food products, including fruits and nuts, the problem of separating the outer shell or husk from the nut or meat of the fruit has been a problem existing for hundreds of years. With the advent of modern-day technology, machine and like devices have been developed, dependent upon the particular food product in question to properly separate and/or treat the fruit so as to recover either the husk and/or the center meat area.

Particularly, in the harvesting and commercial growing of coconuts, a problem exists in the ease of removal of the relatively hard and difficult to remove outer shell or husk portion. Coconut fruit of the type grown commercially is valuable both for the meat of the nut as well as the husk itself. Accordingly, attempts have been made evidenced by prior art devices and machines, which serve to separate the husk from the nut in a manner which will facilitate clean separation and gathering of the husk and recovery of the nut and meat portion.

Development and attempts in the prior art representative of machines used to deshell or dehusk certain specified fruit are represented in the following U.S. Pat. Nos.: 4,504; 4,877; 1,808,744; 2,135,393; 2,319,757; and 4,389,927. Even in light of the long history of development of prior art devices, designed in an attempt to overcome problems existing in this particular area and further in an attempt to facilitate separation of nut or meat from shell or husk, there is still a need in the area of harvesting coconuts for a machine apparatus specifically capable of efficiently separating the husk from the nut and maintaining the nut in an undamaged state for additional processing.

SUMMARY OF THE INVENTION

The present invention is directed towards a machine specifically designed to dehusk coconuts. The machine includes a base or frame positioned on a supporting surface, such as a floor of a processing plant or factory or the like. Two rollers each having an elongated configuration are disposed in spaced apart, substantially parallel relation to one another on the base and in readily accessible relation. A drive means is provided also in supported relation on the base and in direct driving engagement with the rollers. Interconnection of the rollers to the drive means is such that the rollers are forced to rotate in an opposite direction relative to one another and, in a preferred embodiment to be described in greater detail hereinafter, at relatively different speeds. Collectively, the rollers define two outer exposed surfaces which may be considered the upper portions of the roller. In such an orientation, the rollers rotate in a direction towards the center such that a coconut, placed thereon, will be forced into the spacing between the rollers.

An important feature of the present invention is the existence of a penetrating means formed on each roller in the form of a plurality of spikes. The spikes, more specifically, are arranged in a plurality of rows wherein each row has an elongated, curvilinear configuration extending at least along a major portion of the length of each roller. The spikes are sharpened and spaced from one another a substantially equal distance whereby the patterned array in which the plurality of spikes of each roller are positioned facilitate the penetrating and gripping and tearing of the coconut husk once placed on the exposed outer portion of the roller. The relative rotation, in the aforementioned opposite direction, serves to provide a tearing action on the husk, once penetrated by the spikes. The husk, once ripped or separated from the nut or center meat portion of the coconut passes through the spacing between the rollers and onto the supporting surface or any collection device located therebeneath.

Clearing means in the form of two barriers or angularly oriented plates are positioned immediately adjacent to each roller so as to extend along the length thereof. More specifically, a lower, longitudinal peripheral edge of each barrier plate is disposed in immediately adjacent relation to the outer surface of each roller. A plurality of notches are integrally formed in each of the lower peripheral edges and such notches are positioned so as to receive and allow passage therethrough of the individual spikes disposed in the aforementioned patterned array of spikes. The existence of the notches in the configuration set forth above allows for close placement of the peripheral edges of the barrier plates relative to the outer surfaces. This in turn positions the barrier plates in effective close proximity to the outer surfaces of the respective rollers so as to effectively interrupt and dislodge any husk portion or like debris which cling to either of the spike rollers due to their penetration with the spikes. It is readily apparent therefore that the rollers remain clear for efficient and effective engagement with the next coconut or a plurality of coconuts to be processed and dehusked.

The invention accordingly comprises the features of construction, combination of elements, and arrangement of parts which will be exemplified in the construction hereinafter set forth, and the scope of the invention will be indicated in the claims.

BRIEF DESCRIPTION OF THE DRAWINGS

For a fuller understanding of the nature of the present invention, reference should be had to the following detailed description taken in connection with the accompanying drawings in which.

Like reference numerals refer to like parts throughout the several views of the drawings.

DETAILED DESCRIPTION OF THE PREFERRED EMBODIMENT

Figure 1:
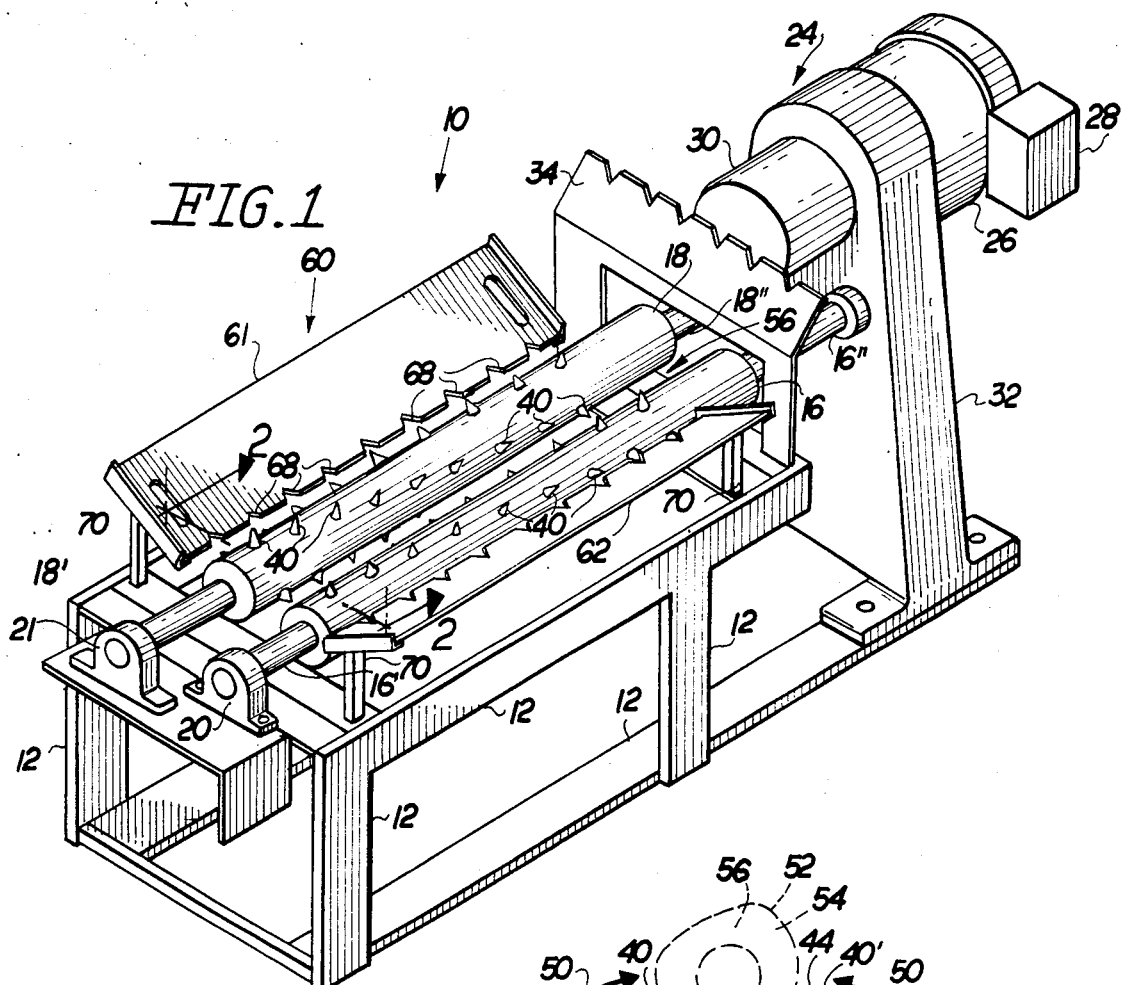
FIG. 1 is a perspective view of the machine of the present invention.

As shown in FIG. 1, the dehusking machine of the present invention is generally indicted as 10 and includes a support base or frame 12 of the type to be mounted or supported on a support surface 14 such as a ground or floor of a processing plant or the like. A plurality of rollers, preferably two in number, as at 16 and 18 both have an elongated configuration and are disposed in spaced apart, substantially parallel relation to one another. Correspondingly positioned distal ends as at 16' and 18' are mounted in bearing assemblies 20 and 21 so as to provide proper support to the rollers 16 and 18 and at the same time facilitate rotation thereof. The proximal ends 16" and 18" are interconnected in direct driving engagement with a drive means generally indicated as 24. The drive means includes a motor casing 26 and control or switch box 28 respectively structured to house an electric driving motor and control switches (not shown for purposes of clarity). The design and operation of the motor and switching assembly mounted respectively in the housings 26 and 28 are of conventional design and operation and sufficient in size and mechanical output to continuously rotate the rollers 16 and 18 in the manner to be described in greater detail hereinafter. Additional housing portions 30 and 32 respectively represent housings or casings for a drive mechanism such as a power takeoff from the motor disposed on the interior of housing 26 and a drive gear or linkage system encased within housing 32. It should be noted that the actual drive components including the gearing and linkage system are arranged relative to one another and to the power takeoff of the drive motor so as to rotate the rollers 16 and 18 in opposite directions (see FIG. 2). A shielding plate 34 is provided generally between and in surrounding relation to the proximal ends 16" and 18" of the rollers 16 and 18 and therefore, as shown in FIG. 2, at least partially obscure the interconnection of the rollers to the power output within casing 30 and the gearing or linkage mechanism within housing 32.

An important feature of the present invention is the incorporation of penetrating means, in the form of a plurality of sharpened spikes 40 located in a patterned array on each of the rollers 16 and 18 and disposed so as to extend along the length thereof for at least a majority of the length of the respective rollers. The plurality of spikes are disposed in substantially equally spaced relation to one another and are preferably arranged in a plurality of rows wherein each row has an elongated curvilinear configuration extending along at least a majority of the length of each roller. This is perhaps best shown in FIG. 1 wherein it is seen that the spaced apart spikes 40 of each row extend in a curvilinear fashion preferably through an arc of 90°. In the embodiments shown in FIGS. 1 and 2, the rollers 16 and 18 each have four rows beginning with a first sharpened spike 40' and extending continuously in spaced relation along the aforementioned curvilinear path to an endmost spike 41. For purposes of clarity and with reference to FIG. 2, each of the frontmost sharpened spikes are indicated as 40' and the rearmost spikes are indicated as 41, 42, 43, and 44, respectively.

Figure 2:
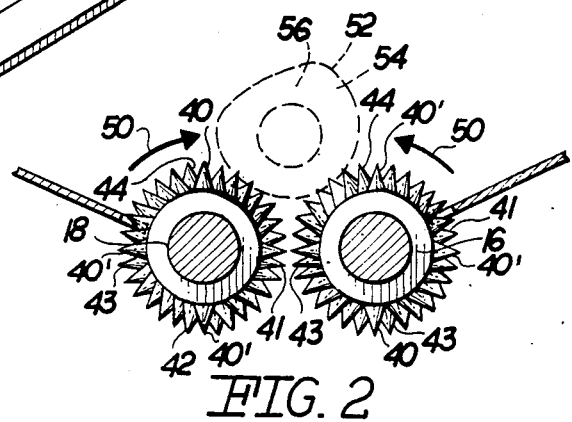
FIG. 2 is a sectional view along line 2—2 of FIG. 1.
Figure 3:
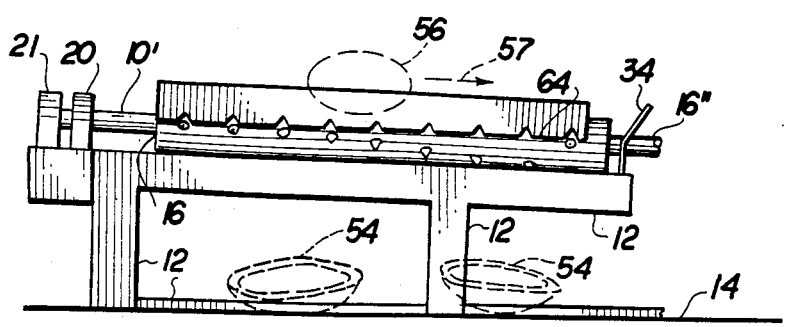
FIG. 3 is a side elevational view in partial cutaway showing an inclined horizontal orientation of the roller, in a preferred embodiment of the present invention, so as to facilitate passage of the coconut meat towards one end of the rollers as indicated by the directional arrow in phantom lines.

Also with reference to FIG. 2, it is seen that the rollers 16 and 18 rotatably move towards one another as indicated by directional arrows 50. The coconut represented in phantom lines as 52 is represented being positioned on the outer exposed surface of the respective rollers 16 and 18 and the rotation of the rollers 16 and 18 towards one another in the manner shown in FIG. 2 serves to penetrate and tear the husk 54 from the nut portion 56 as also shown in FIG. 3. After the husk 54 is totally removed from the nut 56, the husk will pass through the space 56. Accordingly, such space 56 between the rollers 16 and 18 should be sufficient in size to allow the husk 54 to pass therethrough but not so great as to permit the nut 56 to pass therethrough. In order to prevent attachment and fowling of the rollers 16 and 18, a clearing means generally indicated as 60 is provided in the form of two barrier plates 61 and 62 having their lowermost longitudinal peripheral edge as at 64 disposed in direct adjacent and spaced relation to the outer surfaces of the respective rollers 16 and 18. In addition, a plurality of notches 68 are integrally formed in each of the lower edges 64. These notches are dimensioned and disposed to receive and allow passage therethrough of the plurality of spikes 40. Stanchions or support arms 70 are provided so as to properly support and position the barrier plates 61 and 62 in an angularly oriented position relative to the outer surfaces of the rollers 16 and 18. It should be further noted that if desired, the barrier plates may be adjutably mounted on the stanchions 70 so as to be positioned toward and away from the respective rollers.

With regard to the embodiment of FIG. 3, the rollers can be mounted or supported on the frame or base 12 in a substantially horizontally inclined orientation relative to the supporting surface 14 so as to naturally allow passage of the nut 56 (represented in phantom lines) towards one end of the pair of rollers 16 and 18 for collection as generally indicated by directional arrow 57. To this end, the proximal end of the rollers 16 and 18 as best shown in FIG. 1 may be clear of any spikes so as to facilitatie collection of the nut without danger to the operator of the subject machine.

It is therefore to be understood that the following claims are intended to cover all of the generic and specific features of the invention herein described, and all statements of the scope of the invention which as a matter of language, might be said to fall therebetween.

Now that the invention has been described,
What is claimed is:
1. A machine designed for the dehusking of coconuts, comprising:
   (a) a base structured for positioning and support on a supporting surface,
   (b) at least two rollers each having an elongated configuration and being rotatably mounted on said base in spaced, parallel relation to one another,
   (c) penetration means formed on each of said rollers for penetrating the husk of a coconut engaging said rollers,
   (d) said penetration means comprising a plurality of sharpened spikes secured to and protruding outwardly from an outer surface of each of said rollers,
   (e) said plurality of spikes disposed in a patterned array extending along at least a majority of the length of each roller,
   (f) drive means interconnected to said two rollers for forced rotation thereof, said drive means structured to concurrently rotate said rollers in opposite directions, and
   (g) clearing means mounted on said base in immediately adjacent and spaced relation to each of said rollers for cleaning husks from said rollers and said penetration means.
2. A machine as in claim 2 wherein said patterned array of said plurality of spikes comprises a plurality of rows of spikes extending from substantially one end of each roller along a majority of the length thereof.

3. A machine as in claim 2 wherein each of said plurality of rows of spikes are spaced from one another about the periphery of said outer surface of each of said respective rollers.

4. A machine as in claim 3 wherein said plurality of rows are equally spaced from one another about the periphery of each of said rollers.

5. A machine as in claim 2 wherein each of said plurality of rows of spikes on each roller has a curvilinear configuration extending along its length, said plurality of spikes of each row collectively extending through an arc of substantially 90°.

6. A machine as in claim 5 wherein said plurality of rows of spikes are four in number.

7. A machine as in claim 2 wherein each of said plurality of rows of spikes comprises said spikes thereof being equally spaced from the next adjacent spikes and collectively disposed in a curvilinear configuration along the length of said respective row.

8. A machine as in claim 1 wherein said drive means is drivingly interconnected to each of said rollers for rotation thereof at different relative speeds.

9. A machine as in claim 8 wherein said two rollers each rotate in an opposite direction from the other and both rollers are relatively disposed to have their respective outer exposed surfaces rotate towards one another.

10. A machine as in claim 1 wherein said two rollers are spaced a predetermined distance from one another, said predetermined distance defined by a transverse dimension sufficient to allow passage therethrough of a husk of a coconut being treated and prevent passage therethrough of a nut portion of the coconut.

11. A machine as in claim 1 wherein said clearing means comprises two clearing elements each mounted adjacent and in spaced relation to a different roller and disposed in interruptive relation with a husk positioned on and traveling with either of a respective one of said rollers.

12. A machine as in claim 11 wherein each of said two clearing elements comprise a barrier disposed in adjacent relation to an exterior side of and extending along the length of a respective one of said rollers, each barrier including a lower longitudinal edge disposed in immediately spaced and adjacent relation to said outer surface of said respective roller and in interruptive relation to debris thereon.

13. A machine as in claim 12 wherein each barrier element comprises an elongated plate angularly oriented relative to said roller, said lower edge formed along and defined by a lower longitudinal periphery of each plate.

14. A machine as in claim 12 wherein said lower edge of each of said barriers include a plurality of notches disposed in spaced relation to one another and positioned in corresponding relation to said plurality of spikes on each of said respective rollers so as to allow said spikes to pass through said notches.

15. A machine as in claim 1 wherein said two rollers are horizontally inclined relative to the supporting surface on which said base is positioned.

* * * * *